(12) United States Patent
Cutler

(10) Patent No.: US 7,768,544 B2
(45) Date of Patent: Aug. 3, 2010

(54) EMBEDDING A PANORAMIC IMAGE IN A VIDEO STREAM

(76) Inventor: Ross G. Cutler, 16031 277th Pl. NE., Duvall, WA (US) 98019

(*) Notice: Subject to any disclaimer, the term of this patent is extended or adjusted under 35 U.S.C. 154(b) by 1569 days.

(21) Appl. No.: 11/041,427

(22) Filed: Jan. 21, 2005

(65) Prior Publication Data

US 2006/0164552 A1    Jul. 27, 2006

(51) Int. Cl.
H04N 7/18    (2006.01)
(52) U.S. Cl. .......................................... 348/36; 348/39
(58) Field of Classification Search ................ 375/240.01–240.29; 348/36–39, 142–160
See application file for complete search history.

(56) References Cited

U.S. PATENT DOCUMENTS

| | | | |
|---|---|---|---|
| 3,118,340 A | 1/1964 | Iwerks | |
| 5,539,483 A | 7/1996 | Nalwa | |
| 5,745,305 A | 4/1998 | Nalwa | |
| 5,793,527 A | 8/1998 | Nalwa | |
| 5,990,934 A | 11/1999 | Nalwa | |
| 6,043,837 A | 3/2000 | Driscoll, Jr. et al. | |
| 6,111,702 A | 8/2000 | Nalwa | |
| 6,115,176 A | 9/2000 | Nalwa | |
| 6,128,143 A | 10/2000 | Nalwa | |
| 6,141,145 A | 10/2000 | Nalwa | |
| 6,144,501 A | 11/2000 | Nalwa | |
| 6,195,204 B1 | 2/2001 | Nalwa | |
| 6,219,089 B1 | 4/2001 | Driscoll, Jr. et al. | |
| 6,219,090 B1 | 4/2001 | Nalwa | |
| 6,285,365 B1 | 9/2001 | Nalwa | |
| 6,331,869 B1 | 12/2001 | Furlan et al. | |
| 6,337,708 B1 | 1/2002 | Furlan et al. | |
| 6,356,397 B1 | 3/2002 | Nalwa | |
| 6,466,254 B1 | 10/2002 | Furlan et al. | |
| 6,539,547 B2 | 3/2003 | Driscoll, Jr. et al. | |
| 6,677,979 B1 * | 1/2004 | Westfield | 348/14.12 |
| 6,700,711 B2 | 3/2004 | Nalwa | |
| 6,701,017 B1 * | 3/2004 | Nagata et al. | 382/232 |
| 7,020,337 B2 | 3/2006 | Viola et al. | |
| 7,031,499 B2 | 4/2006 | Viola et al. | |
| 7,099,510 B2 | 8/2006 | Jones et al. | |
| 7,197,186 B2 | 3/2007 | Jones et al. | |
| 7,212,651 B2 | 5/2007 | Viola et al. | |
| 2002/0154417 A1 | 10/2002 | Wallerstein et al. | |
| 2004/0021764 A1 | 2/2004 | Driscoll, Jr. et al. | |

FOREIGN PATENT DOCUMENTS

| | | |
|---|---|---|
| JP | 1996125835 A | 5/1996 |
| WO | WO 00/08889 | 2/2000 |
| WO | WO 2004/112290 | 12/2004 |
| WO | WO 2005/002201 | 1/2005 |

* cited by examiner

Primary Examiner—Andy S Rao

(57) ABSTRACT

Techniques are described for embedding a panoramic image in standard resolution. A panoramic image is received from a panoramic camera and a location of a speaker is determined, either automatically or manually. A portion of the panoramic image is cropped to isolate the speaker and the cropped portion of the image is enlarged to standard video resolution. The panoramic image is combined with the cropped portion and transmitted via a standard video streaming format. In at least one implementation, the panoramic image is normalized so that face sizes of persons in the image appear approximately equal regardless of the distance each person is situated relative to the camera.

20 Claims, 7 Drawing Sheets

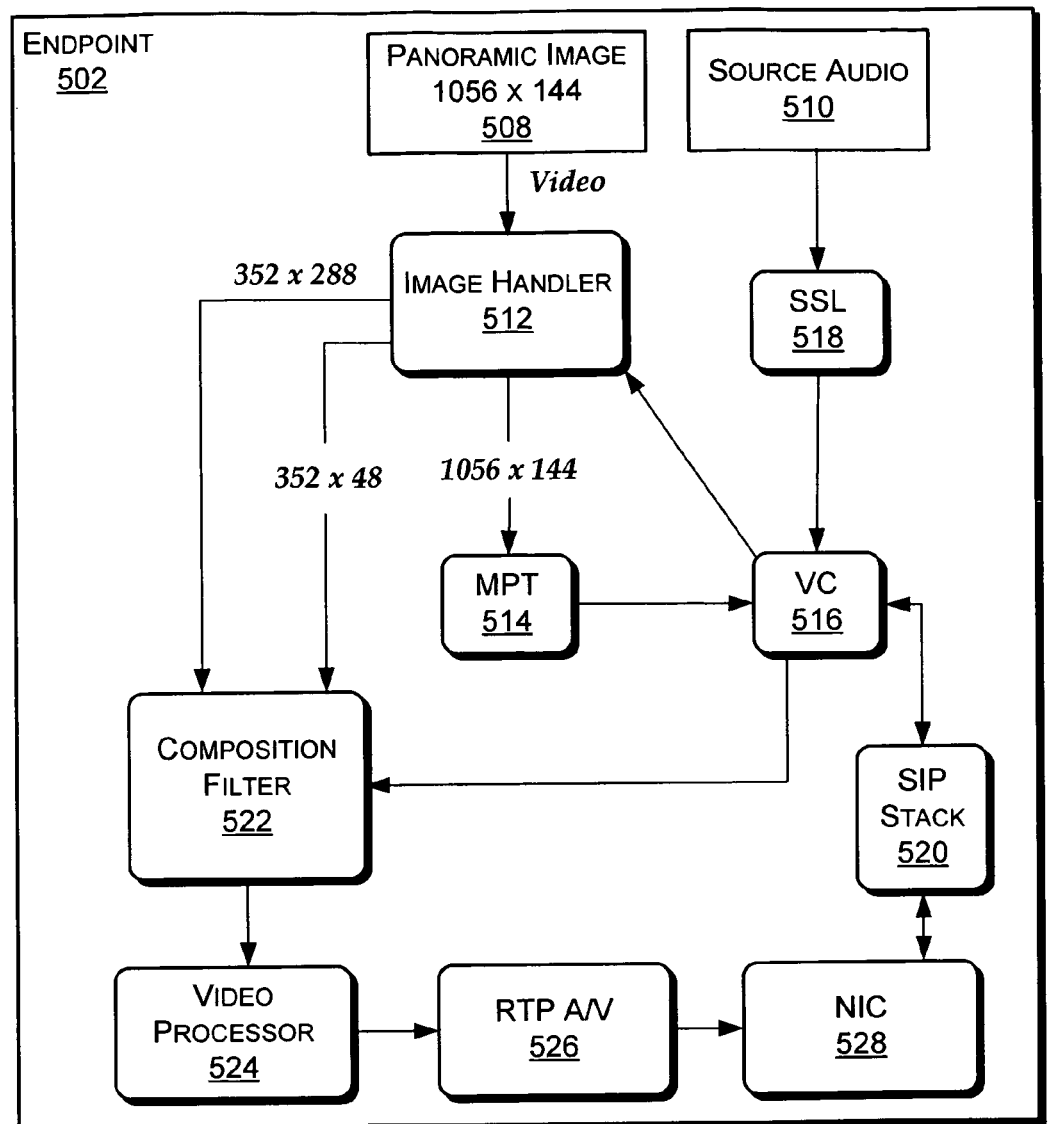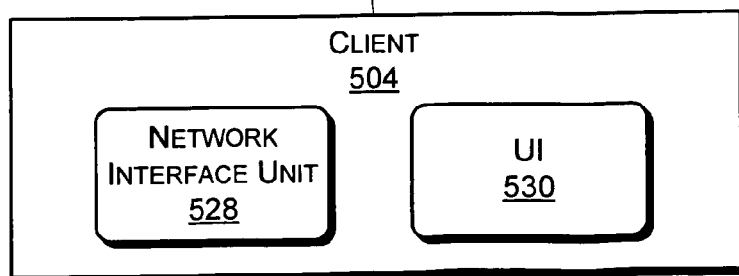
FIG. 5

EMBEDDING A PANORAMIC IMAGE IN A VIDEO STREAM

TECHNICAL FIELD

The following description relates generally to image processing. More specifically, the following description relates to embedding a panoramic image in standard resolution video stream.

BACKGROUND

Panoramic cameras that image a wide area up to three hundred and sixty degrees (360°) have proven to be very useful in conference room situations, where all participants in a meeting can be imaged by a single photographic device. Resolution for panoramic images (e.g. 1056×144) differs from standard streaming video resolution (e.g. 352×288) that is utilized by most existing video conferencing systems. Simply transmitting a panoramic image in standard resolution does not provide a rich user experience.

If the panorama is resized to fit in a standard video stream but maintain the correct aspect ratio, the faces of meeting participants will appear too small to be practically useful once the panorama has been resized (e.g. to 352×48). If the panorama is cropped to fit in a standard video window, a majority of a display of the video stream is unused.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 5 is a process diagram of an exemplary system for embedding a panorama in a standard resolution video stream.

DETAILED DESCRIPTION

Figure 1:
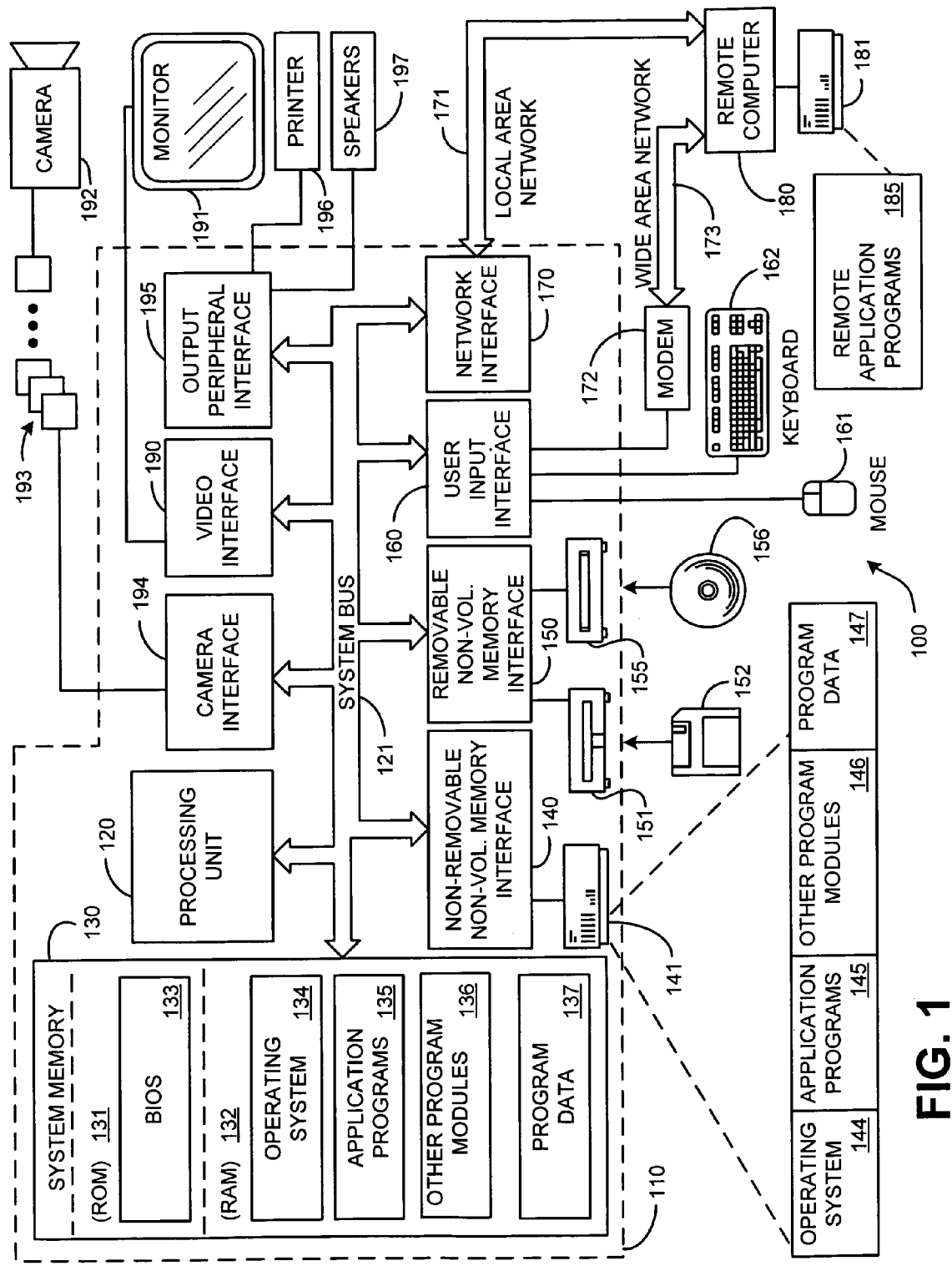
FIG. 1 is a block diagram depicting an exemplary general purpose computing/camera device.

Panoramic camera devices have become useful in imaging meetings where it is desirable to capture images of all meeting participants. However, to provide interoperability with conferencing systems that are already in place, panoramic imaging systems must be made compatible with standard video resolution as it currently exists.

Typically, to make optimum use of display area and to make a video conferencing system more practically useful, it is desirable to display a second, standard image with a panoramic image. For example, a meeting speaker may be shown in a standard display together with a panorama that shows all meeting participants.

The following description provides several examples of embedding a panoramic image in a standard resolution video stream. A panoramic image is resized to fit in a standard resolution display—such as a CIF (Common Intermediate Format)—but the image is first normalized so that faces of people sitting farther away from a camera taking the image appear about the same size as faces of people sitting closer to the camera. As a result, face sizes have a practically useful appearance.

In at least one implementation, determining which of several meeting participants is a speaker is accomplished automatically utilizing face tracking and sound source localization. The speaker is then featured in the standard display. In an alternative implementation, a user can manually select a point on a panoramic image to feature in the standard image. A user may select a certain meeting participant and that meeting participant is then featured in the standard image. A user may also identify a specific span of the panorama that the user wants to isolate. The panoramic image may then be resized and displayed so that only the identified span of the image is displayed to the user.

In at least one other implementation, a current speaker is highlighted in the panoramic image such as, for example, by displaying a highlight bar underneath the speaker. The highlight may be enabled or disabled by a user via the user interface.

In at least one implementation, one or more computer-readable media may contain executable instructions that, when executed, implement steps, the steps including: displaying a first image in standard video resolution, the image including a panoramic image and a first close-up image; receiving user input identifying a location on the panoramic image; transmitting data regarding the identified location; and displaying a second image in standard video resolution, the image including the panoramic image and a second close-up image, the second close-up image including the location identified by the user input.

In at least one implementation, one or more computer-readable media may contain executable instructions that, when executed, implement steps, the steps including: displaying a first image in standard video resolution, the image including a panoramic image and a first close-up image; receiving user input identifying a location on the panoramic image; transmitting data regarding the identified location; displaying a second image in standard video resolution, the image including the panoramic image and a second close-up image, the second close-up image including the location identified by the user input; and displaying a speaker highlight that identifies a speaker in the panoramic image.

In at least one implementation, one or more computer-readable media may contain executable instructions that, when executed, implement steps, the steps including: displaying a first image in standard video resolution, the image including a panoramic image and a first close-up image; receiving user input identifying a location on the panoramic image; transmitting data regarding the identified location; displaying a second image in standard video resolution, the image including the panoramic image and a second close-up image, the second close-up image including the location identified by the user input; displaying a speaker highlight that identifies a speaker in the panoramic image; displaying a user control that, when actuated by a user, enables the speaker highlight; detecting a user actuation of the user control; and displaying the speaker highlight only in response to detecting the user actuation of the user control.

In at least one implementation, one or more computer-readable media may contain executable instructions that, when executed, implement steps, the steps including: displaying a first image in standard video resolution, the image including a panoramic image and a first close-up image;

receiving user input identifying a location on the panoramic image; transmitting data regarding the identified location; displaying a second image in standard video resolution, the image including the panoramic image and a second close-up image, the second close-up image including the location identified by the user input; displaying a speaker highlight that identifies a speaker in the panoramic image; displaying a user control that, when actuated by a user, disables the speaker highlight; detecting a user actuation of the user control; and disabling the speaker highlight.

Other features and benefits may be discerned from the following description, which is made with reference to the accompanying figures.

Exemplary Operating Environment

FIG. 1 is a block diagram depicting a general purpose computing/camera device. The computing system environment 100 is only one example of a suitable computing environment and is not intended to suggest any limitation as to the scope of use or functionality of the claimed subject matter. Neither should the computing environment 100 be interpreted as having any dependency or requirement relating to any one or combination of components illustrated in the exemplary operating environment 100.

The described techniques and objects are operational with numerous other general purpose or special purpose computing system environments or configurations. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The following description may be couched in the general context of computer-executable instructions, such as program modules, being executed by a computer. Generally, program modules include routines, programs, objects, components, data structures, etc. that perform particular tasks or implement particular abstract data types. The described implementations may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through anon-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as an input device to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Photographic Device

Figure 2:
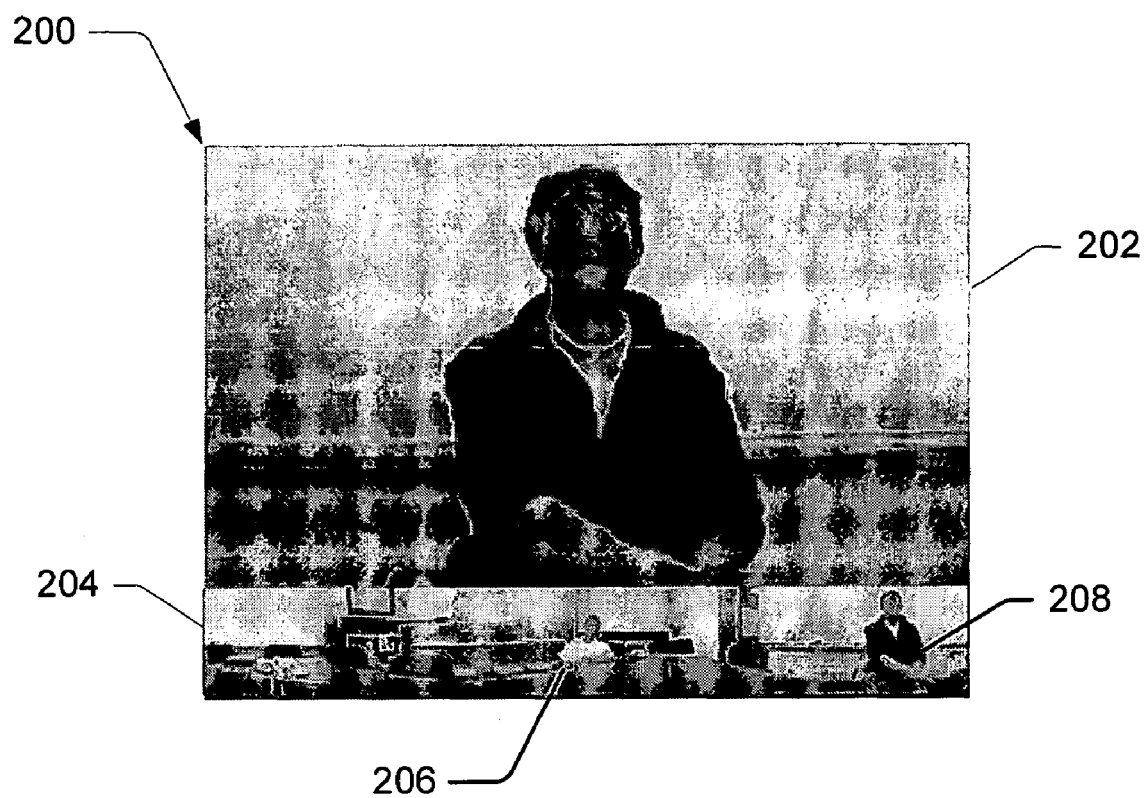
FIG. 2 is an example of an image including a CIF (Common Intermediate Format) image and a panoramic image.

FIG. 2 is an example of an image 200 including a standard resolution, e.g. CIF (common intermediate format), image 202 and a panoramic image 204. The CIF format is used by example only and the standard resolution may be any other resolution known in the art. In this particular example, the standard resolution image 202 has a resolution of 352×288 and is overlaid by the panoramic image 204 which has a resolution of 352×48. As a result, the actual resolution of the visible standard resolution image 202 is 352×240.

The panoramic image 204 is a cylindrical panorama. In other words, objects imaged by the panoramic camera (not shown) that produces the panoramic image 204 are situated at varying distances from the panoramic camera. As a result, a size of a face of a person sitting farther away from the camera (e.g. meeting participant 206) appears smaller than a size of a face of a person sitting closer to the camera (e.g. meeting participant 208).

Cylindrical panoramic images may present a problem when the panorama is resized to the degree necessary to include the panorama in a standard resolution video stream. Face sizes of meeting participants seated farther away from the camera (such as a person sitting at an end of a rectangular table as opposed to a person sitting at a side of the same table) may be reduced to a point where the person is unrecognizable in the panoramic image. This can render the use of such a resized panorama practically unacceptable.

Exemplary Normalized Panoramic Image

Figure 3:
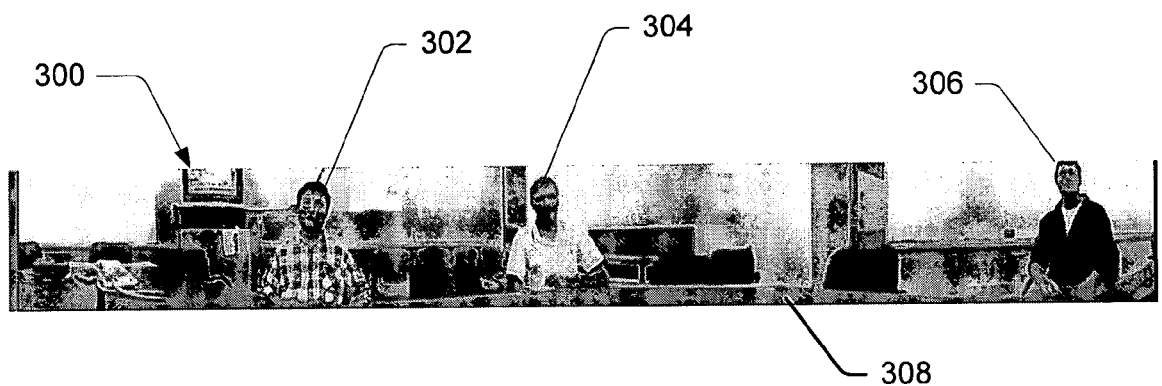
FIG. 3 is an example of a normalized panorama.

FIG. 3 is an example of a non-cylindrical panorama 300 that has been normalized so that images of faces appear about the same size regardless of how far a subject is located from the camera. The exemplary panorama 300 shows a first meeting participant 302, a second meeting participant 304 and a third meeting participant 306 seated around a 5'×10' conference table 308.

Figure 7:
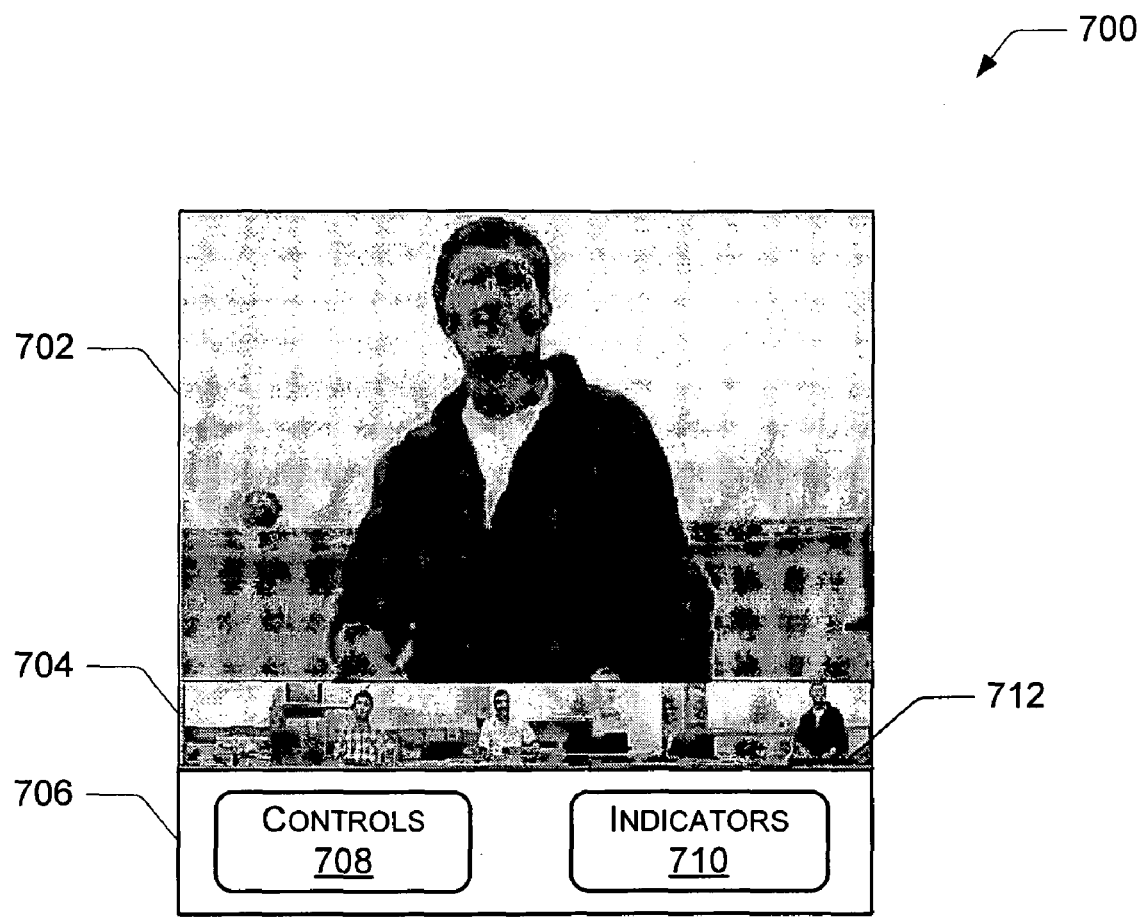
FIG. 7 is an exemplary image having a CIF image, a panoramic image, a user interface and a speaker highlight.

The first meeting participant 302 and the third meeting participant 306 are each situated along a side of the conference table 308 and the second meeting participant 304 is situated at an end of the conference table 308. As a result, the second meeting participant 304 is positioned a greater distance from the camera as the other meeting participants. Without normalization, the size of the face of the second meeting participant 304 would be much smaller and practically unrecognizable (similar to the meeting participant 206 of FIG. 2). FIG. 7 shows a non-cylindrical panorama embedded in a CIF video stream.

The normalization is accomplished using a warping technique that compensates for the distance that a subject is located from the camera. One or more suitable warping techniques are described in the publication "Real-Time Warps for Improved Wide-Angle Viewing" by Zicheng Liu and Michael Cohen (November 2002). Said publication is incorporated herein by reference for all that it discloses and teaches.

Warping as applied to panoramic images is described in U.S. patent application Ser. No. 10/262,292 filed Sep. 30, 2003, entitled "Foveated Wide-Angle Systems and Method for Capturing and Viewing Wide-Angle Images in Real Time," by Zicheng Liu and Michael Cohen. Said application is assigned to Microsoft Corp. and is incorporated herein by reference for all that it discloses and teaches.

By normalizing the panoramic image before it is resized to a resolution necessary for inclusion in a standard resolution image, the problem of unrecognizable faces due to distance from the camera is minimized. Such normalization may be performed in conjunction with one or more other techniques described in detail below.

Exemplary Conferencing Architecture

Figure 4:
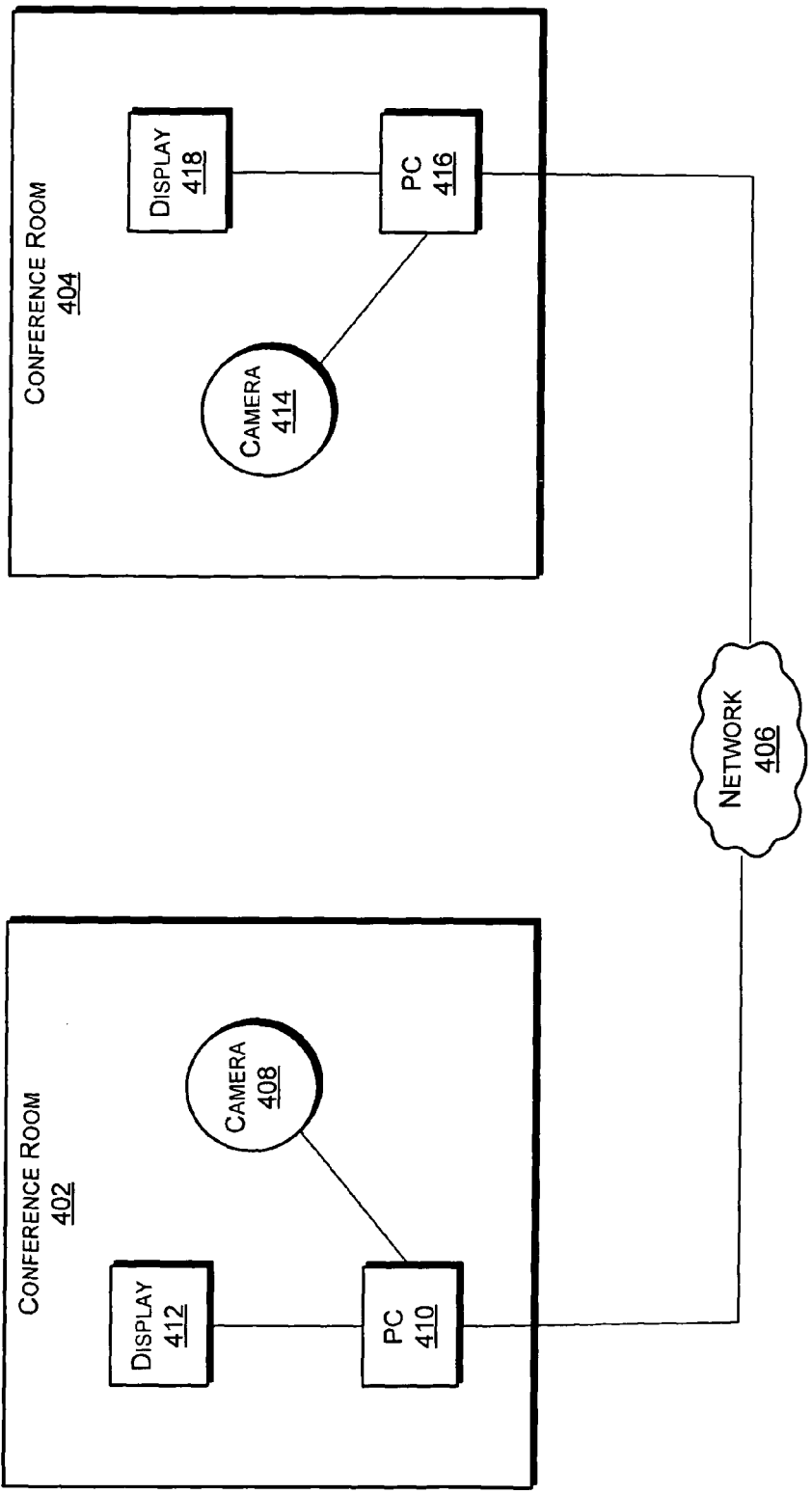
FIG. 4 is a diagram of an exemplary conferencing architecture.

FIG. 4 is a diagram of an exemplary conferencing architecture 400. The exemplary conferencing architecture 400—simplified for discussion purposes—includes conference room 402 and conference room 404 which are connected via a network 406, such as an intranet.

Conference room 402 includes a panoramic camera 408 that is connected to a computing device (e.g. PC) 410. The conference room 402 also includes a display 412 such as a video screen. Conference room 404 also includes a panoramic camera 414, a computing device (e.g. PC) 416 and a display 418.

It is noted that the conference rooms may contain more elements than those shown in FIG. 4, such as a projector, a speaker phone, etc. that are included in a typical conference room. However, the elements shown in FIG. 4 have been limited for discussion purposes.

In a typical operation, from one to several meeting participants are located in conference room 402 and one to several meeting participants are situated in conference room 404. The panoramic cameras 408, 414 each image all the meeting participants and produce a panoramic image (not shown) thereof. A standard image is cropped from the panoramic image.

The panorama is normalized and the panorama and the standard image are transmitted via the network 406 to the other conference room 402, 404. The combined images are then rendered on the appropriate display 412, 418.

A user interface (not shown) that is described below is available at each conference room 402, 404. Through the user interface, meeting participants in one conference room can control the panoramic camera and the images from the other conference room. The user interface may be a part of the panoramic camera or may be available on the computing device 410, 416.

It is noted that in the following discussion, certain actions are attributed to certain elements, such as a panoramic camera or a computing device. Those skilled in the art will understand that these actions may be allocated to different elements and/or devices in keeping with the present description.

Exemplary Implementation: Embedding Panorama in Standard Video

FIG. 5 is a process diagram of an exemplary system 500 for embedding a panorama in a standard resolution video stream. The exemplary system 500 includes an endpoint 502 and a client 504 that communicate via a network 506. Elements in the endpoint 502 may be included with a panoramic camera or may be included in a client connected to a panoramic camera. As shown here, the endpoint received a panoramic image 508 and source audio 510. Whether the images and audio are received by the endpoint 502 or are captured directly by the endpoint 502 is irrelevant for the purposes of the present discussion.

It is noted that while only pertinent elements are shown in the exemplary system 500, other elements may also be included in the endpoint 502 and/or the client 504, such as one or more elements that appear in FIG. 1. Any element required to perform the functionality described with respect to FIG. 4 is deemed to be included in the exemplary system 500 (such as, for example, processing unit 120).

The standard panoramic image 508 (e.g. resolution of 1056×144) is received by an image handler 512 that is configured, among other things, to resize images, crop portions from images and normalize panoramic images. To normalize the panoramic image 508, the image handler 512 applies a warping algorithm as previously referenced so that sizes of faces of imaged meeting participants appear about the same size and even faces of participants seated some distance from the camera are recognizable.

The image handler 512 outputs the normalized panorama to a multi-person tracker (MPT) 514 that is configured to identify locations of each face appearing in the panorama by using a face tracker method. Various face tracker methods (or person detection and tracking systems may be used as described herein. The multi-person tracker 514 can use any face tracking technique known in the art.

One face tracking technique and face tracker are described in U.S. patent application Ser. No. 10/177,315, entitled "A System and Method for Distributed Meetings", filed Jun. 21, 2002 by the present inventor and assigned to Microsoft Corp., the assignee of the present application. Said application is incorporated herein by reference for all that it teaches and discloses.

The multi-person tracker 514 outputs the normalized panorama 508 to a virtual cinematographer (VC) 516 together with data identifying locations of each face recognized in the panorama 508. The virtual cinematographer 516 combines this information with data received from a sound source locator (SSL) 518 to identify a speaker in the panoramic image 508.

The sound source locator 516 received source audio 510 that includes input from a microphone array (not shown) that may be integrated with a panoramic camera that provides the panoramic image 508. The sound source locator 516 identifies a direction of a speaker and the virtual cinematographer locates a face that has been identified in the same direction on the panoramic image 508. The virtual cinematographer 516 then identifies that face to be the speaker.

The virtual cinematographer 516 provides information to the image handler 512 that identifies a location in the panoramic image 508 of a speaker. The virtual cinematographer 516 also receives information from a SIP stack 520 that has been received from the client 504 that it may use to modify the panoramic image. For example, the client 504 may indicate that it has selected an option to highlight the speaker. If so, the virtual cinematographer 516 adds a highlighting reference to the panoramic image 508. The SIP stack 520 and options provided via the client 504 will be discussed in greater detail below.

When the image handler 512 has information identifying a speaker, the image handler 512 (in at least one implementation) is also configured to crop a portion from the panoramic image 508 that includes the identified speaker. The cropped portion is then resized to a standard resolution (e.g. CIF, 4CIF, Quarter CIF (QCIF), etc.). In the present example, the cropped portion is transmitted at CIF resolution (352×288).

Depending on the implementation, the image handler 512 may resize the CIF image to accommodate a combination with the panoramic image. For example, if the resized panoramic image has a resolution of 352×48, then the CIF image may be resized to a resolution of 352×240 so that the combined image utilizes the available 352×288 resolution. However, if the panoramic image is to be overlaid on the CIF image, such a resizing step is not required.

The image handler 512 outputs the CIF image (i.e. the speaker image) and the normalized panoramic image to a composition filter 522 which combines the images into a single image. This may be done by overlaying the panoramic image across the bottom of the CIF image. Since the bottom of the CIF image will typically be nothing more than a table at which the speaker is sitting, it is improbable that such an overlay will affect the substance of the combined image.

The composition filter 522 outputs the combined image to a video processor 524 that converts the image to a transmittable protocol such as RTP (Real-time Transport Protocol) and the RTP audio/video (A/V) 526 is sent over the network 506 via a network interface unit 528.

The network interface unit 528 is also configured to receive data from the client 506 via the network 506 and to provide this data to the SIP stack 520. As previously mentioned, such data may include a speaker selection option. As will be discussed in greater detail below, other commands and/or data from the client 504 may also be added to the SIP stack 520.

The client receives the RTP A/V 526 via a client network interface unit 530 and processes the RTP A/V 526 to display the RTP A/V 526 to client 504 users. Although not explicitly shown, the client 504 includes processing hardware and display capabilities that allow the RTP A/V 526 to be rendered.

The client 504 also includes a user interface 532 through which a client 504 user can receive information from the endpoint 502 and provide feedback to the endpoint 502. In addition to the speaker selection option mentioned previously (wherein a client user can enable or disable speaker highlighting), the user interface 530 may provide controls (not shown) that enable the user to select an automatic or manual mode.

An automatic mode enables the endpoint 502 to automatically detect a speaker as described above, with the multi-person tracker 514 and the sound source locator 518. A manual mode would allow a client user to select a particular portion of the panoramic image (of the RTP A/V 526) that the user wants to be used in the CIF portion of the combined image. This allows a user to focus on, for example, a whiteboard instead of a speaker, or the reaction of someone who isn't speaking.

One way in which a user can designate a portion of the panoramic image to be used in the CIF image is to configure the user interface 532 to accept a mouse click in a location on the panoramic portion of the combined image. The location of the mouse click is converted to an angle $\theta$ (between the left margin (0°) of the panorama and the right margin (360°) of the panorama. If the horizontal resolution is 352 and the mouse click occurs at, for example, pixel 300, then $\theta = 300/352 * 360 = 306.8°$.

In the event that a manual mode is enabled, $\theta$ is passed to the virtual cinematographer 516 and is used to identify a portion of the panorama to be isolated as the CIF image. The virtual cinematographer 516 is configured to use this information received from the client 504 instead of data received from the multi-person tracker 514 and the sound source locator 518.

The user interface 532 may also include a control that allows a user to identify an area of the panoramic image that is less than the full 360° to display across the horizontal resolution of the panoramic image. If the user identifies such an area, the information eventually reached the image handler 512, which may be configured to resize the panoramic image accordingly. This allows a user to enlarge an area of the panoramic image, such as a whiteboard or an area that includes each participant of interest to the user.

These and other features and functions of the endpoint 502 and the client user interface 532 will be discussed below with reference to subsequent figures.

Exemplary Methodological Implementation: Embedding Panoramas

Figure 6:
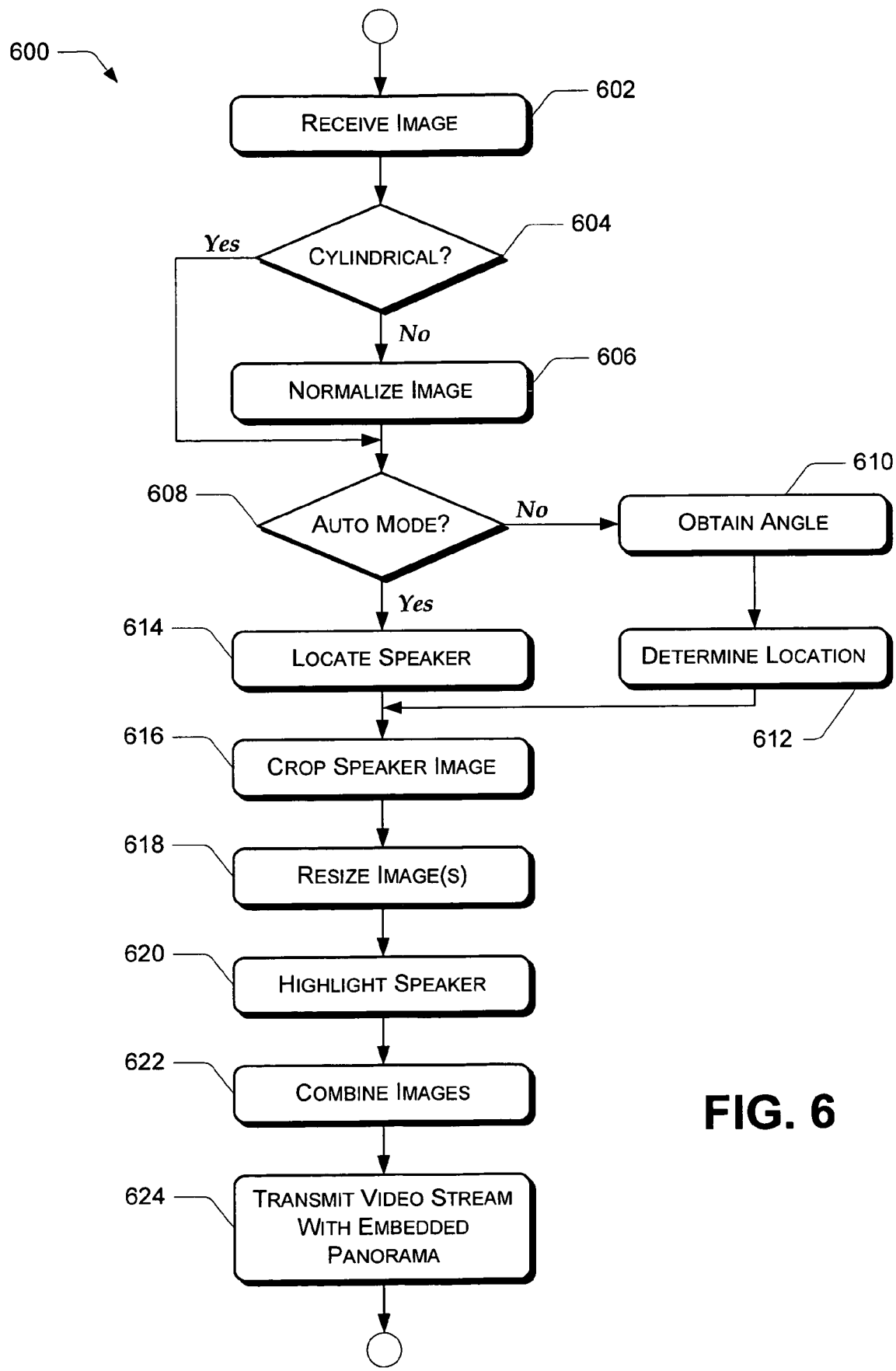
FIG. 6 is a flow diagram depicting an exemplary process for embedding a panorama in a standard resolution video stream.

FIG. 6 is a flow diagram depicting an exemplary methodological implementation for embedding a panoramic image in standard resolution video. In the following discussion, continuing reference is made to elements and reference numerals shown in FIG. 5.

At block 602, the panoramic image 508 is received by the image handler 512. If the panoramic image is a non-cylindrical panorama ("Yes" branch, block 604), then the image handler 512 normalizes the panorama at block 606. If the panoramic image is a cylindrical panorama ("No" branch, block 604), then normalization is not required.

The endpoint 502 determines if an automatic mode or a manual mode has been indicated by the client 504. This information is received in the SIP stack 520 from the user interface 530 of the client 504. If in automatic mode ("Yes" branch, block 608), then the virtual cinematographer 516 identifies a speaker from information received from the multi-person tracker 514 and the sound source locator 518. If in manual mode ("No" branch, block 608), a direction (i.e. angle $\theta$) is obtained from the SIP stack 520 and the virtual cinematographer 516 determines a location of the panoramic image identified by the client 504.

At block 616, the image handler 512 crops the speaker image (or other identified location) from the panoramic image and resizes the speaker images for use as the CIF image at block 618. If the client 504 has identified a span of less than 360° to be shown in the panoramic image area, the image handler 512 resizes the panorama to the desired span identified by the client 504 (block 618).

The speaker is highlighted in the panoramic image at block 620 (unless the highlighting option has been disabled from the client). This may be done in one of several ways. In at least one implementation (see FIG. 7), a bar is imaged under the image of the speaker in the panorama. Any other highlighting method known in the art may also be implemented.

At block 622, the composition filter 522 combines the CIF image with the panoramic image. In at least one implementation, this is accomplished by laying the panorama over the bottom of the CIF image. In an alternative implementation, the image handler resizes the CIF image so that the panorama does not occlude any of the CIF image. The panorama is then appended to the CIF image by the composition filter 522 before the video stream (RTP A/V) is transmitted with the embedded panorama (block 624).

it is noted that the process outlined in the flow diagram, above, is but one implementation of a process for embedding a panoramic image in standard resolution video. Alternative implementations identified above may also be used in accordance with the present description.

Exemplary Image

FIG. 7 is an exemplary image 700 made up of a speaker image (e.g. CIF image) 702, a normalized panoramic image 704 and a user interface 706 in accordance with the present description. The user interface 706 includes one or more controls 708 and one or more indicators 710. In addition, a speaker highlight 712 in the panoramic image 704 indicates a current speaker (also pictured in the speaker image).

The user interface 706 provides any number of controls 708 through which a user can control the exemplary image. For example, a user may use a control 708 to identify a location of the panoramic image 704 that is to be shown as the speaker image 702. Another control may allow the user to turn off (and on) or otherwise modify the speaker highlight 712. The controls are not restricted to the region shown in 708. For example, clicking in 704 can be a control to manually pan the speaker window via the virtual cinematographer 516 and the SIP stack 520. Other controls, such as a volume control, may also be included.

The indicators 710 may provide data to the user in the form of various displays. Other types of indicators, such as light emitting diodes (LEDs), etc., may also be situated on a display or console associated with the exemplary image.

The exemplary image 700 shows how a panoramic image can be included with a standard image in a way such that persons images in the panorama are recognizable even after the panoramic image has been resized to comply with the standard resolution video. As such, the exemplary image 700 provides a more practical video conferencing solution.

CONCLUSION

While one or more exemplary implementations have been illustrated and described, it will be appreciated that various changes can be made therein without departing from the spirit and scope of the claims appended hereto.

The invention claimed is:

1. A method, comprising:
    receiving a panoramic image by at least one device comprising a processing unit and a system memory;
    duplicating, on the at least one device, the a primary portion of the panoramic image;
    resizing, on the at least one device, the primary portion to a primary image;
    resizing, on the at least one device, the panoramic image;
    combining, on the at least one device, the resized panoramic image with the primary image to form a combined image at a standard video resolution; and
    transmitting the combined image according to a standard resolution video protocol.

2. The method as recited in claim 1, further comprising:
    locating, automatically on the at least one device, a speaker in the panoramic image; and
    using, on the at least one device, a portion of the panoramic image that contains the located speaker as a primary portion of the panoramic image.

3. The method as recited in claim 2, the locating the speaker in the panoramic image further comprising:
    locating, automatically on the at least one device, a direction of a speaker.

4. The method as recited in claim 2, further comprising:
    identifying the speaker in the panoramic image; and
    inserting, on the at least one device, a highlight that identifies the speaker in the panoramic image portion of the combined image.

5. The method as recited in claim 2, wherein the locating the speaker in the panoramic image further comprises processing video and audio data to identify a probable speaker in the panoramic image.

6. The method as recited in claim 4, further comprising receiving, on the at least one device, input from a client that indicates the client has selected an option to highlight the speaker that the at least one device has identified in the panoramic image.

7. The method as recited in claim 1, further comprising normalizing, on the at least one device, the panoramic image so that faces appearing in the panoramic image appear to be approximately the same size.

8. A system, comprising:
    means for receiving a panoramic image;
    means for automatically identifying a close-up portion of the panoramic image;
    means for duplicating the close-up portion of the panoramic image and resizing the close-up portion to a close-up image having a standard video resolution that is different from a resolution of the panoramic image;
    means for combining the panoramic image and the close-up image into a combined image of the standard video resolution; and
    means for transmitting the combined image to a client device.

9. The system as recited in claim 8, wherein the panoramic image is a normalized panoramic image.

10. The system as recited in claim 8, wherein the panoramic image is a non-normalized cylindrical panoramic image, the system further comprising normalizing means for normalizing the panoramic image.

11. The system as recited in claim 8, wherein the means for automatically identifying a close-up portion of the panoramic image further comprises:
    face tracking means for automatically identifying one or more faces in the panoramic image;
    sound source location means for automatically identifying a direction on the panoramic image from which a primary sound is detected;
    means for processing data from the face tracking means and the sound source location means to automatically identify a speaker in the panoramic image; and
    wherein the close-up portion of the panoramic image is identified as including the speaker in the panoramic image.

12. The system as recited in claim 8, further comprising:
    means for identifying a speaker in the panoramic image; and
    means for highlighting the speaker in the panoramic image.

13. The system as recited in claim 12, wherein the means for highlighting the speaker in the panoramic image further comprises receiving data from the client device indicating the client has selected an option to highlight the identified speaker.

14. One or more memory storage device containing executable instructions that, when executed, implement the following steps:
    normalizing a panoramic image so that all faces appearing in the panoramic image are approximately the same size
    displaying a first image in standard video resolution, the image including the panoramic image and a first close-up image;
    receiving user input identifying a location on the panoramic image;
    transmitting data regarding the identified location; and
    displaying a second image in standard video resolution, the second image including the panoramic image and a second close-up image, the second close-up image including the location identified by the user input.

15. The one or more memory storage device as recited in claim 14, further comprising executable instructions that, when executed, implement the additional step of displaying a speaker highlight that identifies a speaker in the panoramic image.

16. The one or more memory storage device as recited in claim 15, further comprising executable instructions that, when executed, implement the additional steps of:
    displaying a user control that, when actuated by a user, enables the speaker highlight;
    detecting a user actuation of the user control; and
    displaying the speaker highlight only in response to detecting the user actuation of the user control.

17. The one or more memory storage device as recited in claim 15, further comprising executable instructions that, when executed, implement the additional steps of:
    displaying a user control that, when actuated by a user, disables the speaker highlight;
    detecting a user actuation of the user control; and
    disabling the speaker highlight.

18. The method of claim 1, wherein the standard resolution video protocol is a real-time video protocol.

19. The method of claim 18, wherein the real-time video protocol is Real-time Transport Protocol (RTP).

20. The method of claim 1, wherein the combining the resized panoramic image with the primary image to form a combined image further comprises:
    overlaying the resized panoramic image across the bottom of the primary image.

* * * * *